(12) United States Patent
Engelsoy et al.

(10) Patent No.: US 12,715,468 B2
(45) Date of Patent: Aug. 25, 2026

(54) WAY POINT GENERATION FOR SMOOTHER ACTUATION USING MACHINE LEARNING MODEL

(71) Applicant: AUTOBRAINS TECHNOLOGIES LTD, Tel Aviv-Jaffa (IL)

(72) Inventors: Julius Engelsoy, Tel-Aviv (IL); Armin Biess, Tel-Aviv (IL); Isaac Misri, Tel-Aviv (IL); Joey Hendry, Bat-Yam (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 113 days.

(21) Appl. No.: 18/627,432

(22) Filed: Apr. 4, 2024

(65) Prior Publication Data

US 2025/0313227 A1 Oct. 9, 2025

(51) Int. Cl.

| | |
|---|---|
| ***B60W 60/00*** | (2020.01) |
| ***B60W 50/00*** | (2006.01) |
| ***G06T 7/00*** | (2017.01) |
| ***G06T 7/70*** | (2017.01) |
| ***G06V 10/00*** | (2022.01) |
| ***G06V 10/80*** | (2022.01) |
| ***G06V 10/82*** | (2022.01) |
| ***G06V 20/56*** | (2022.01) |

(52) U.S. Cl.
CPC ...... *B60W 60/001* (2020.02); *B60W 50/0097* (2013.01); *G06T 7/70* (2017.01); *G06V 10/80* (2022.01); *G06V 10/82* (2022.01); *G06V 20/56* (2022.01); *B60W 2420/403* (2013.01); *B60W 2556/35* (2020.02); *G06T 2207/10021* (2013.01); *G06T 2207/20084* (2013.01); *G06T 2207/30252* (2013.01)

(58) Field of Classification Search
CPC ........... B60W 60/001; B60W 50/0097; B60W 2556/35; B60W 2420/403; G06T 7/70; G06T 2207/10021; G06T 2207/20084; G06T 2207/30252; G06V 10/82; G06V 10/80; G06V 20/56
USPC .......................................................... 701/25
See application file for complete search history.

(56) References Cited

U.S. PATENT DOCUMENTS

2019/0318502 A1* 10/2019 He ......................... G06N 3/084
2021/0181754 A1* 6/2021 Cui ........................ G06N 3/045

FOREIGN PATENT DOCUMENTS

WO WO-2023089635 A1 * 5/2023 ............ B60W 60/00

* cited by examiner

*Primary Examiner* — Tiffany P Young
(74) *Attorney, Agent, or Firm* — RECHES PATENTS

(57) ABSTRACT

There is provided a method for training of machine learning processes for autonomous driving applications, the method includes (a) receiving a training dataset that includes images acquired during a driving episode of a vehicle, the images associated with inertial measurement unit information that includes velocity values and yaw rate values; (b) estimating, based on the images and the inertial measurement unit information, waypoints indicative of waypoints passed by the vehicle during the driving episode; and (c) training a machine learning process using the images and the estimated waypoints, to produce a predictable set of future waypoints indicative of future waypoints on a driving route of a vehicle.

16 Claims, 5 Drawing Sheets

400

Figure 1C:
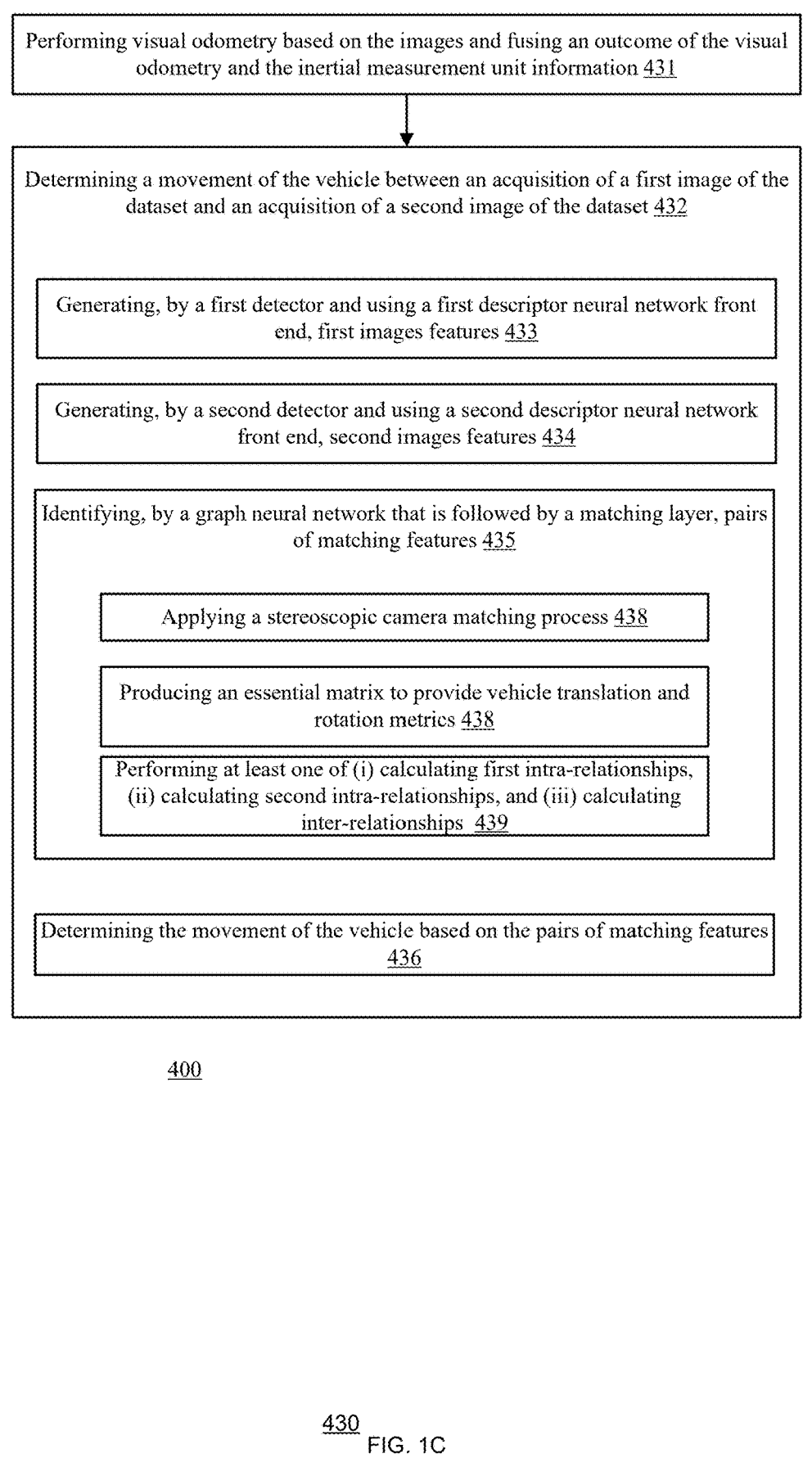

Performing visual odometry based on the images and fusing an outcome of the visual odometry and the inertial measurement unit information 431

Determining a movement of the vehicle between an acquisition of a first image of the dataset and an acquisition of a second image of the dataset 432

Generating, by a first detector and using a first descriptor neural network front end, first images features 433

Generating, by a second detector and using a second descriptor neural network front end, second images features 434

Identifying, by a graph neural network that is followed by a matching layer, pairs of matching features 435

Applying a stereoscopic camera matching process 438

Producing an essential matrix to provide vehicle translation and rotation metrics 438

Performing at least one of (i) calculating first intra-relationships, (ii) calculating second intra-relationships, and (iii) calculating inter-relationships 439

Determining the movement of the vehicle based on the pairs of matching features 436

WAY POINT GENERATION FOR SMOOTHER ACTUATION USING MACHINE LEARNING MODEL

BACKGROUND

Assisted and autonomous driving systems are known in the art. In such systems, computer implemented systems control (at least to some extent) some, or all, of a vehicle's driving functions, e.g., speed, telemetry, braking, etc. The vehicle is typically equipped with one or more sensors to provide the system with current information regarding the driving environment.

The current information for the driving environment is typically used by the driving system to determine how to drive on roadways. The determination may be highly complex and may consume extensive resources.

There is a growing need to provide efficient driving related decisions.

SUMMARY

A method, a system, and a non-transitory computer readable medium as illustrated in the application.

A BRIEF DESCRIPTION OF THE DRAWINGS

The embodiments of the disclosure will be understood and appreciated more fully from the following detailed description, taken in conjunction with the drawings in which:

FIG. 1C illustrates an example of various steps of the method of FIG. 1B;

DETAILED DESCRIPTION

Figure 1A:
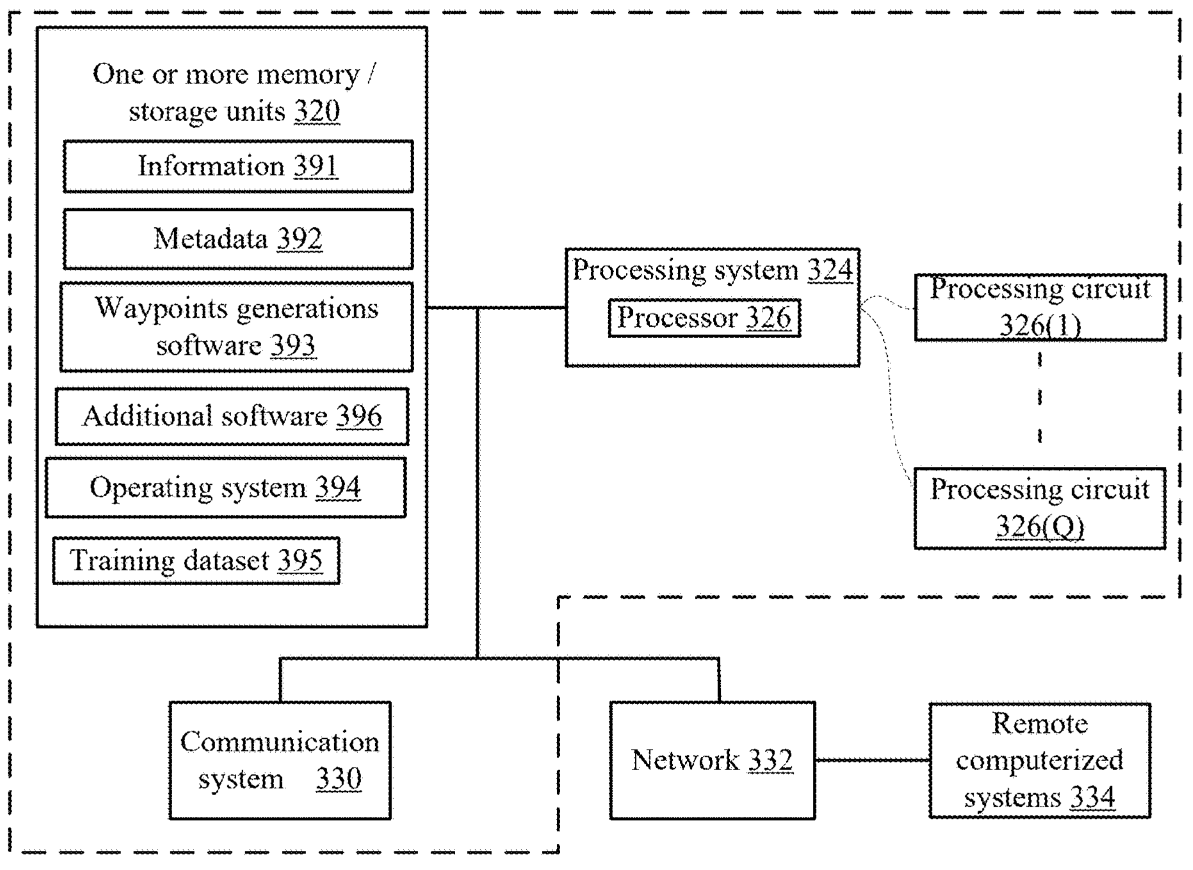
FIG. 1A illustrates an example of a system.

The different figures illustrates examples of units and/or software and/or information items and/or steps and/or components. These examples are provided for brevity of explanation. At least one of the units and/or software and/or information items and/or steps and/or components is optional or mandatory.

Examples of autonomous driving applications includes advanced drive assistance system (ADAS) applications, autonomous driving applications, and the like.

When training an image based end-to-end imitation learning model, the model is required to predict waypoints to then be used by a downstream controller for smoother actuation. As such, ground truth waypoints should be provided to the training algorithm. The prediction of multiple future waypoints provides the downstream controller (for expel vehicle computer, ADAS control unit, autonomous driving unit) to calculate the path of the vehicle over a longer span of time—which allows the path to be smoother.

It has been surprisingly found that the model may be highly accurate when it is trained with only four waypoints—which is a small number of waypoints—and using the four waypoints provides a significant saving in resources.

According to an embodiment the four waypoints are spaced apart by 0.5 second. For example—at time=0 s the future positions of the ego vehicle are required at 0.5 s, 1 s, 1.5 s, and 2 s for training the model.

There is provided an innovative method to generate these waypoints from recorded episodes based on visual odometry and ego vehicle signals.

According to an embodiment, the generation of the waypoints is preceded by recording driving episodes and saving the image from the driving episode and corresponding inertial measurement unit (IMU) signals that include timestamp, velocity, yaw rate, and the like. Corresponding means taken at the same point of time or within an allowable time difference (for example a difference that does not exceed 5, 10, 15, 20, 25, 30, 35, percent and the like from the time difference between consecutive waypoints).

Once this data is saved the method uses visual odometry and/or IMU signals to estimate the waypoints which will then be used to train the models.

According to an embodiment the method employs a graph neural network such as the SuperGlue to estimate the lateral and longitudinal shifts between two consecutive images in a sequence of images. These shifts are saved and accumulated while playing through the saved episode. At each timestep, the method can assign a current position of the ego (which is obtained from the accumulated position shifts up to that point in time) as a first, second, third or fourth waypoint for four separate previous timesteps. This process is repeated until the end of the saved episode so that for each ego position and time, the method has the next four waypoints spaced 0.5 s apart.

According to an embodiment, the method uses kinematics equations using the saved velocity and yaw rate of the ego vehicle at each time step.

Similarly, lateral and longitudinal shifts are calculated and accumulated while playing through the saved episode and waypoints are saved and assigned to corresponding previous timesteps using the same method mentioned above.

According to an embodiment, the method can use either of these methods for waypoints estimation or the method may select a weighted sum or a mean of the outcomes of both methods.

Once waypoint estimates have been generated for several episodes, they can be used as ground truth values for training the model.

There is provided a computer implemented method and a non-transitory computer readable medium that FIG. 1A illustrates an example of a computerized system 300.

According to embodiment, the computerized system 300 is selected out of at least one of a vehicle computerized system, an out of vehicle computerized system, a computerized system that has one part within a vehicle and another part outside of a vehicle, a cloud based computerized system, a distributed computerized system, a centralized computerized system, a server, a laptop, a desktop, a mobile computerized system, a stationary computerized system, and the like.

Computerized system 300 includes a communication network 330, one or more memory and/or storage units 230, network 332 is in communication within one or more remote computerized systems 334, and a processing system 324 that includes a processor 326 that includes a plurality (Q) of processing circuits 326(1)-326(Q).

An example of one of the remote computerized systems 334 is the computerized system illustrated in FIG. 2A, 2B or AC and includes processing system 124 and one or more memory/storage units 120.

The communication system 330 is configured to enable communication between the one or more memory and/or storage units 320 and/or the sensing system 310 and/or any one of the additional units and/or the network 332 (that is in communication with the remote computerized systems).

The one or more memory and/or storage units 320 are configured to store firmware and/or software (such as waypoint generation software 393 and additional software 396), one or more operating systems (such as operating system 394), information 391 and metadata 392 required to the execution of one or more of the methods mentioned in this application—for example method 400. Examples of information and/or metadata include training dataset 395. It should be noted that there may be multiple training datasets, and/or testing datasets, and the like.

The memory and/or storage units 320 was shown as storing software. Any reference to software should be applied mutatis mutandis to code and/or firmware and/or instructions and/or commands, and the like.

Any reference to one unit or item should be applied mutatis mutandis to multiple units or items. For example—any reference to processor should be applied mutatis mutandis to multiple processors, any reference to communication system 330 should be applied mutatis mutandis to multiple communication systems.

According to an embodiment, the one or more memory and/or storage units 320 includes one or more memory unit, each memory unit may include one or more memory banks.

According to an embodiment, the one or more memory and/or storage units 320 includes a volatile memory and/or a non-volatile memory. The one or more memory and/or storage units 320 may be a random access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory unit.

According to an embodiment, the at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. Communication elements other than communication system 330 may be provided.

The communication system 330 may include a bus. The represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 332 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 330) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 320 may be stored outside the vehicle. It should also be noted that the processor may evaluate signatures generated by a plurality of detectors.

Figure 1B:
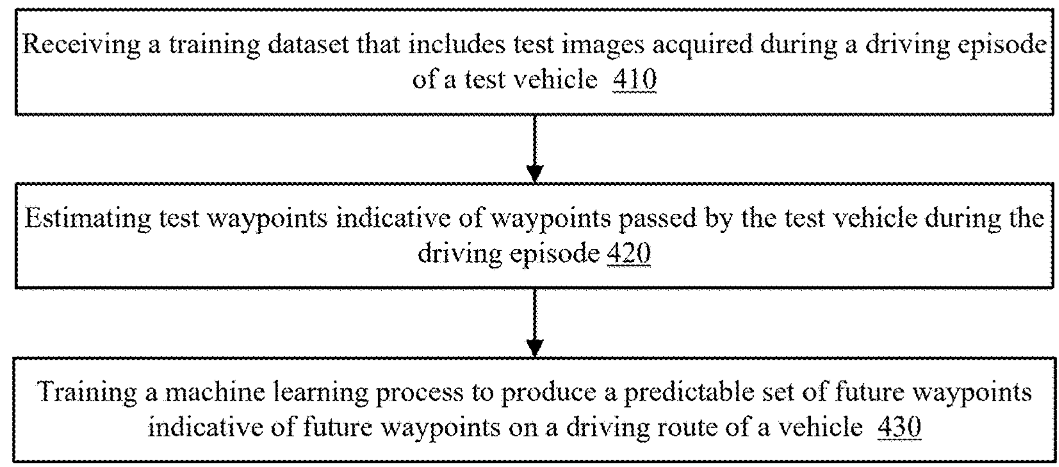
FIG. 1B illustrates an example of a method.

FIG. 1B illustrates an example of method 400 that is computer implemented and is for training of machine learning processes for autonomous driving applications.

According to an embodiment, method 400 starts by step 410 of receiving a training dataset that includes test images acquired during a driving episode of a test vehicle, the test images and associated with test inertial measurement unit (IMU) information.

According to an embodiment, step 410 is followed by step 420 of estimating, based on the test images and the test inertial measurement unit information, test waypoints indicative of waypoints passed by the test vehicle during the driving episode.

According to an embodiment, step 420 is followed by step 430 of training a machine learning process using the test images and the estimated test waypoints, to produce a predictable set of future waypoints indicative of future waypoints on a driving route of a vehicle.

According to an embodiment, the set of future waypoints includes two to six future waypoints.

According to an embodiment, the set of future waypoints consists of four future waypoints.

According to an embodiment, the set of future waypoints includes future waypoints that are spaced apart by a period of time that ranges between a tenth of a second and a second.

According to an embodiment, the set of future waypoints includes future waypoints that are spaced apart by a period of time that equals a second.

FIG. 1C illustrates an example of step 430 of method 400.

According to an embodiment, step 430 includes step 431 of performing visual odometry based on the images and fusing an outcome of the visual odometry and the inertial measurement unit information.

According to an embodiment step 431 includes step 432 of determining a movement of the vehicle between an acquisition of a first image of the dataset and an acquisition of a second image of the dataset.

According to an embodiment, step 432 includes:

a. Step 433 of generating, by a first detector and using a first descriptor neural network front end, first images features.

b. Step 434 of generating, by a second detector and using a second descriptor neural network front end, second images features.
c. Step 435 of identifying, by a graph neural network that is followed by a matching layer, pairs of matching features, each pair includes a first image feature and a corresponding second image feature.
d. Step 436 of determining the movement of the vehicle based on the pairs of matching features.

According to an embodiment, an image feature is indicative of a location of a keypoint. The image feature may also be indicative of a visual content (visual descriptor) of the key point.

According to an embodiment, step 435 includes at least one of the following:

a. Step 437 of applying a stereoscopic camera matching process on the pairs of matching features. The stereoscopic camera matching process was originally used to fuse images applies by two different sensing units (usually having different point of view to a scene) of a stereoscopic camera.
b. Step 438 of producing an essential matrix based on the pairs of matching features and decomposing the essential matrix to provide vehicle translation and rotation metrics.
c. Step 439 of performing at least one of (i) calculating intra-relationships between first image features, (ii) calculating intra-relationships between first second image features, and (iii) calculating inter-relationships between first image features and corresponding second image features.

According to an embodiment the first descriptor neural network is also the second descriptor neural network.

According to an embodiment, the first descriptor neural network differs from the second descriptor neural network.

Figure 1D:
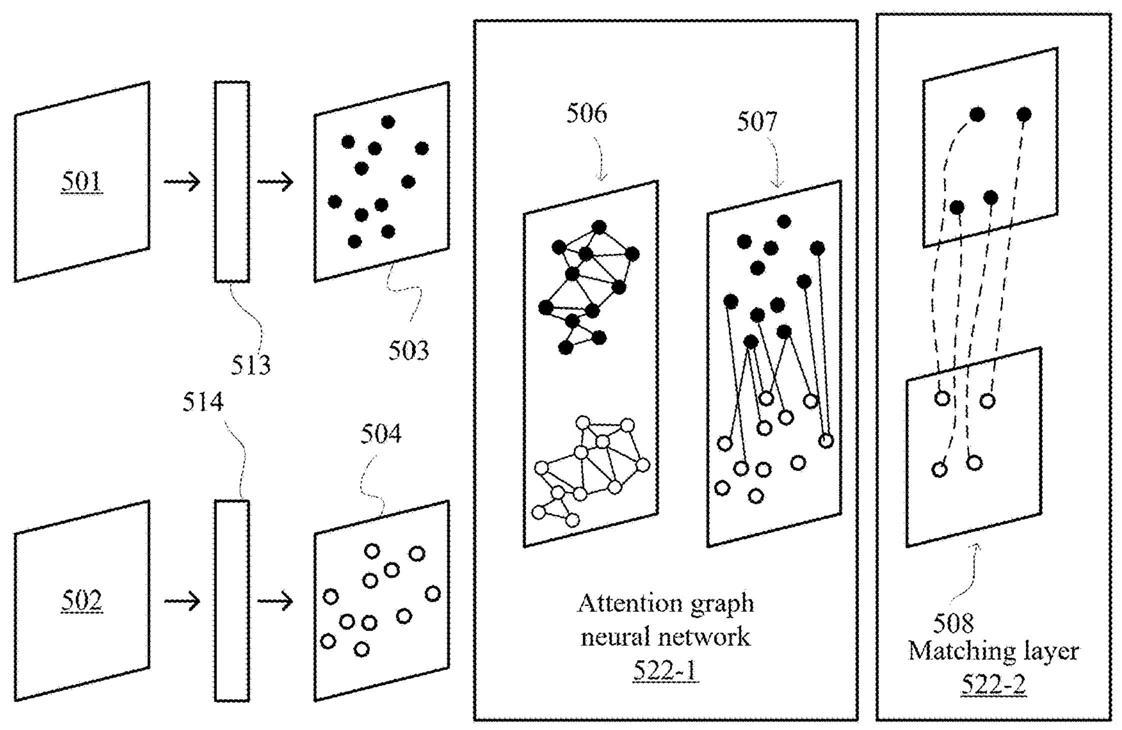
FIG. 1D illustrates an example of a neural network, a matching layer and various calculations executed by the processor of the system of FIG. 1.
Figure 1D:
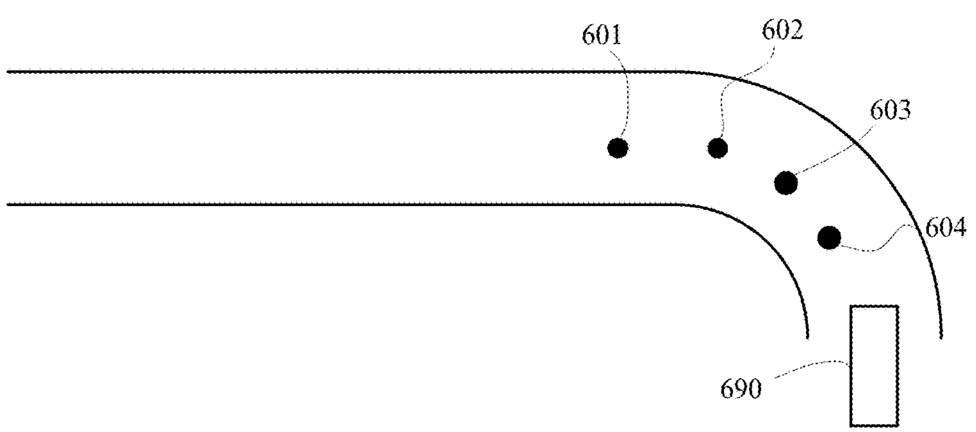

FIG. 1D illustrates an example of:

a. A first image 501 that is fed to detector and descriptor deep front end that includes a first descriptor neural network 513 that generates first images features 503 such as first keypoints.
b. A second image 502 that is fed to detector and descriptor deep front end that includes a second descriptor neural network 514 that generates second images features 504 such as second keypoints.
c. An attention graph neural network 522-1 that is followed by a matching layer 522-2 (both parts may be regarded a graph neural network)—such as a deep middle end matcher—that are configured to pair of matching features, each pair includes a first image feature and a corresponding second image feature. FIG. 1D illustrates the calculating of calculating intra-relationships (506), the calculating of the inter-relationships (507) and finding the matching pairs. Each pair may provide an indication of a movement between the first and second image (for example the difference in their locations) and the movement information of the multiple pairs is taken into account when calculating the movement of the vehicle between the time of acquisition of the first image and the time of acquisition of the second image.
d. A vehicle 690 that is located at a certain location and a set of estimated waypoints 601, 602, 603 and 604.

Figure 2:
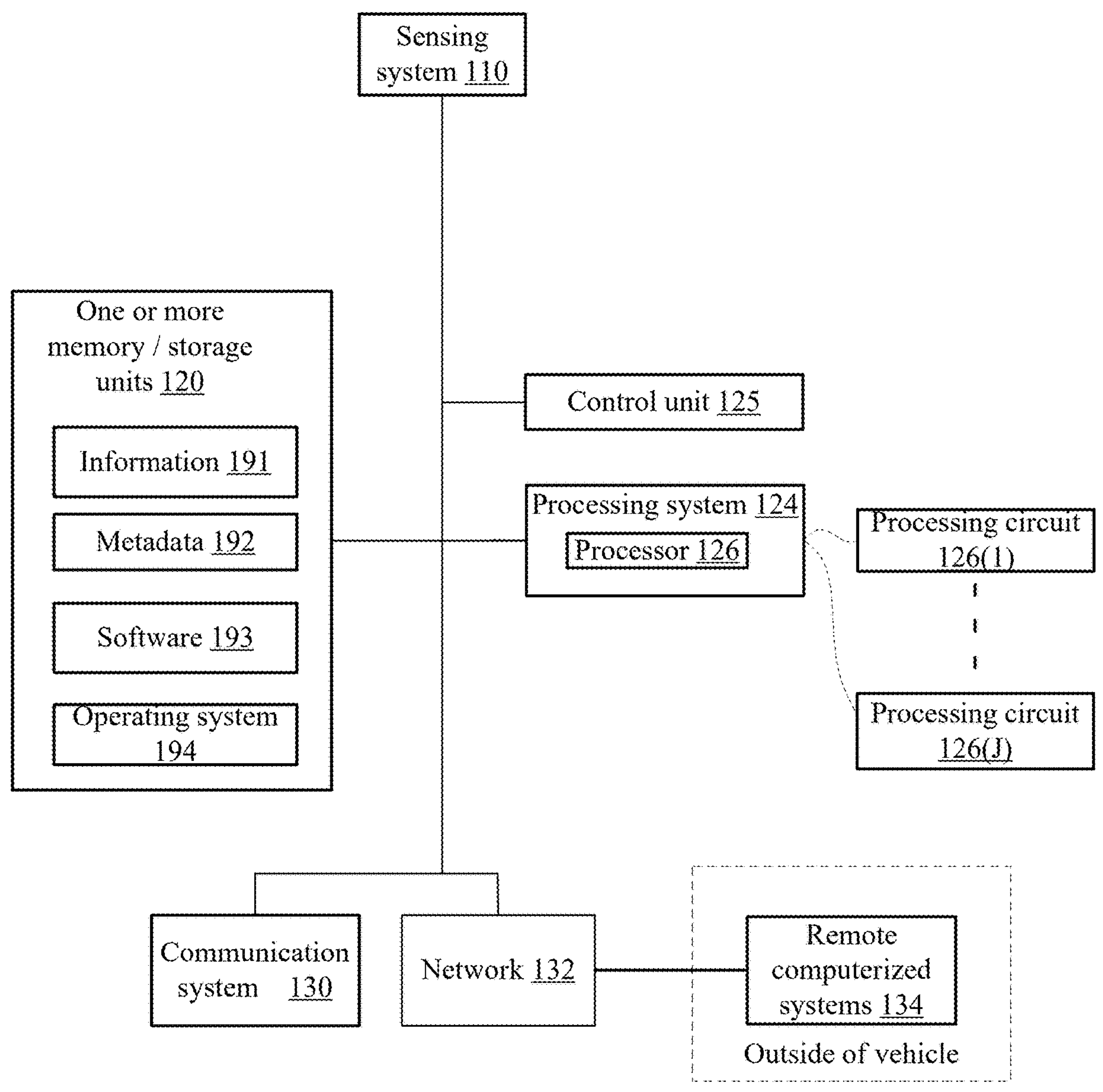
FIG. 2 illustrates an example of a system.

FIG. 2 illustrate an examples of a vehicle 100, a network 123 and remote computerized systems 134.

In FIG. 2 the vehicle 100 is illustrated as including sensing system 110, a communication system 130, one or more memory and/or storage units 120, control unit 125, a processing unit 124 that include a processor 126, and a network 132 in communication with remote computerized systems 134.

The one or more memory and/or storage units 120 is illustrated as storing information 191, metadata 192, software 193 and operating system 194. The information 191, metadata 192, software 193 and operating system 194 are required for executing one or more methods illustrated in the specification.

According to an embodiment, the software 193 once executed by the processor 126 causes the processor to implement a machine learning process (trained by method 400) that given images acquired during a driving session and test waypoints estimated to be passed by the vehicle—to produce a predictable set of future waypoints indicative of future waypoints on a driving route of the vehicle.

The predictable set of the future waypoints may be fed to at least one of a vehicle computer, an autonomous driving control unit and/or an ADAS control unit.

The vehicle computer 121 may be in communication with an engine control module, a transmission control module, a powertrain control module, and the like The memory and/or storage units 120 was shown as storing software. Any reference to software should be applied mutatis mutandis to code and/or firmware and/or instructions and/or commands, and the like.

Processor 126 includes a plurality of processing units 126(1)-126(J), J is an integer that exceeds one. Any reference to one unit or item should be applied mutatis mutandis to multiple units or items. For exampleany reference to processor should be applied mutatis mutandis to multiple processors, any reference to communication system 130 should be applied mutatis mutandis to multiple communication systems.

According to an embodiment, the one or more memory and/or storage units 120 includes one or more memory unit, each memory unit may include one or more memory banks.

According to an embodiment, the one or more memory and/or storage units 120 includes a volatile memory and/or a non-volatile memory. The one or more memory and/or storage units 120 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 130. Other communication elements may be provided.

FIG. 1 illustrates communication system 130 as being in communication with various processors and/or units and network 132.

The communication system 130 may include a bus. The represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 132 is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 130) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 120 may be stored outside the vehicle. It should also be noted that the processor may evaluate signatures generated by a plurality of detectors.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of transformation module, active learning module, or clustering module, or any other module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle—such as a ground transportation vehicle, an airborne vehicle, or a water vessel.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

We claim:

1. A method for training of machine learning processes for autonomous driving applications, the method comprises:

receiving a training dataset comprising images acquired during a driving episode of a vehicle, the images associated with inertial measurement unit information;

estimating, based on the images and the inertial measurement unit information, waypoints indicative of waypoints passed by the vehicle during the driving episode; wherein the estimating comprises performing visual odometry based on the images and fusing an outcome of the visual odometry and the inertial measurement unit information; wherein the visual odometry comprises determining a movement of the vehicle between an acquisition of a first image of the dataset and an acquisition of a second image of the dataset; wherein determining the movement of the vehicle further comprises:

generating, by a first detector and using a first descriptor neural network front end, first image features;

generating, by a second detector and using a second descriptor neural network front end, second image features;

identifying, pairs of matching image features, each pair comprises a first image feature and a corresponding second image feature; wherein the identifying comprises (i) calculating intra-relationships between first image features, (ii) calculating intra-relationships between first second image features, and (iii) calculating inter-relationships between first image features and corresponding second image features; wherein the determining of the movement of the vehicle is based on the pairs of matching image features;

training a machine learning process using the images and the estimated waypoints, to produce a predictable set of future waypoints indicative of future waypoints on a driving route of a vehicle;

providing to the machine learning process and during a driving session of the vehicle, (a) images acquired by sensors of the vehicle during the driving session and (b) waypoints estimated to be passed by the vehicle;

producing by the machine learning process a set of future waypoints on a future driving route of the vehicle; and feeding the set of future waypoints to an autonomous driving unit of the vehicle;

planning the future path of the vehicle by the autonomous driving unit; and autonomously driving the vehicle, under a control of the autonomous driving unit, along the future path.

2. The method according to claim 1, wherein the determining of the movement of the vehicle further comprises applying a stereoscopic camera matching process on the pairs.

3. The method according to claim 1, wherein the determining of the movement of the vehicle further comprises producing an essential matrix based on the pairs of matching features and decomposing the essential matrix to provide vehicle translation and rotation metrics.

4. The method according to claim 1, wherein the first descriptor neural network is also the second descriptor neural network.

5. The method according to claim 1, wherein the first descriptor neural network differs from the second descriptor neural network.

6. The method according to claim 1, wherein the set of future waypoints comprises two to six future waypoints.

7. The method according to claim 1, wherein the set of future waypoints consists of four future waypoints.

8. The method according to claim 1, wherein the set of future waypoints comprises future waypoints that are spaced apart by a period of time that ranges between a tenth of a second and a second.

9. The method according to claim 1, wherein the set of future waypoints comprises future waypoints that are spaced apart by a period of time that equals a second.

10. The method according to claim 1, wherein the identifying is executed by a graph neural network that is followed by a matching layer.

11. A non-transitory computer readable medium for training of machine learning processes for autonomous driving applications, the non-transitory computer readable medium stores instructions that once executed by a computerized system cause the object computerized system to:

receive a training dataset comprising images acquired during a driving episode of a vehicle, the images associated with inertial measurement unit information;

estimate, based on the images and the inertial measurement unit information, waypoints indicative of waypoints passed by the vehicle during the driving episode; wherein the estimating comprises performing visual odometry based on the images and fusing an outcome of the visual odometry and the inertial measurement unit information; wherein the visual odometry comprises determining a movement of the vehicle between an acquisition of a first image of the dataset and an acquisition of a second image of the dataset; wherein determining the movement of the vehicle further comprises:

generating, by a first detector and using a first descriptor neural network front end, first image features;

generating, by a second detector and using a second descriptor neural network front end, second image features;

identifying, pairs of matching image features, each pair comprises a first image feature and a corresponding second image feature; wherein the identifying comprises (i) calculating intra-relationships between first image features, (ii) calculating intra-relationships between first second image features, and (iii) calculating inter-relationships between first image features and corresponding second image features; wherein the determining of the movement of the vehicle is based on the pairs of matching image features;

train a machine learning process using the images and the estimated waypoints, to produce a predictable set of future waypoints indicative of future waypoints on a driving route of a vehicle;

provide to the machine learning process and during a driving session of the vehicle, (a) images acquired by sensors of the vehicle during the driving session and (b) waypoints estimated to be passed by the vehicle;

produce by the machine learning process a set of future waypoints on a future driving route of the vehicle; and feed the set of future waypoints to an autonomous driving unit of the vehicle;

plan the future path of the vehicle by the autonomous driving unit; and autonomously drive the vehicle, under a control of the autonomous driving unit, along the future path.

12. The non-transitory computer readable medium according to claim 11, wherein the determining of the movement of the vehicle further comprises applying a stereoscopic camera matching process on the pairs of matching features.

13. The non-transitory computer readable medium according to claim 11, wherein the determining of the movement of the vehicle further comprises producing an essential matrix based on the pairs of matching features and decomposing the essential matrix to provide vehicle translation and rotation metrics.

14. The non-transitory computer readable medium according to claim 11, wherein the set of future waypoints comprises two to six future waypoints.

15. The non-transitory computer readable medium according to claim 11, wherein the set of future waypoints consists of four future waypoints.

16. The non-transitory computer readable medium according to claim 11, wherein the identifying is executed by a graph neural network that is followed by a matching layer.

* * * * *